(12) United States Patent
Furches et al.

(10) Patent No.: US 8,127,246 B2
(45) Date of Patent: Feb. 28, 2012

(54) VARYING USER INTERFACE ELEMENT BASED ON MOVEMENT

(75) Inventors: Elizabeth Caroline Furches, San Francisco, CA (US); Imran A Chaudhri, San Francisco, CA (US); Bas Ording, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 808 days.

(21) Appl. No.: 11/865,664

(22) Filed: Oct. 1, 2007

(65) Prior Publication Data

US 2009/0089706 A1    Apr. 2, 2009

(51) Int. Cl.
*G06F 3/048* (2006.01)
*G06F 3/00* (2006.01)
*G06T 13/00* (2011.01)

(52) U.S. Cl. ........ 715/787; 715/784; 715/785; 715/786; 715/830; 715/973; 345/341; 345/473

(58) Field of Classification Search .................. 715/787, 715/784, 785, 786, 830, 973; 345/341, 473
See application file for complete search history.

(56) References Cited

U.S. PATENT DOCUMENTS

| | | | |
|---|---|---|---|
| 4,644,351 A | 2/1987 | Zabarsky et al. | |
| 4,903,212 A | 2/1990 | Yokouchi et al. | |
| 5,031,104 A | 7/1991 | Ikeda et al. | |
| 5,067,081 A | 11/1991 | Person | |
| 5,182,555 A | 1/1993 | Sumner | |
| 5,187,810 A | 2/1993 | Toneyama et al. | |
| 5,195,031 A | 3/1993 | Ordish | |
| 5,243,652 A | 9/1993 | Teare | |
| 5,337,044 A | 8/1994 | Folger et al. | |
| 5,339,391 A * | 8/1994 | Wroblewski et al. | 345/607 |
| 5,371,678 A | 12/1994 | Nomura | |
| 5,379,057 A | 1/1995 | Clough et al. | |
| 5,406,490 A | 4/1995 | Braegas | |
| 5,416,890 A | 5/1995 | Beretta | |
| 5,469,362 A | 11/1995 | Hunt et al. | |
| 5,479,600 A * | 12/1995 | Wroblewski et al. | 715/787 |
| 5,519,760 A | 5/1996 | Borkowski et al. | |
| 5,523,950 A | 6/1996 | Peterson | |
| 5,537,460 A | 7/1996 | Holliday, Jr. et al. | |
| 5,539,395 A | 7/1996 | Buss | |
| 5,539,647 A | 7/1996 | Shibata et al. | |
| 5,552,989 A | 9/1996 | Bertrand | |
| 5,559,520 A | 9/1996 | Barzegar et al. | |
| 5,570,412 A | 10/1996 | LeBlanc | |

(Continued)

FOREIGN PATENT DOCUMENTS

BR    9904979    12/2000

(Continued)

OTHER PUBLICATIONS

Microsoft Word, 2003, 1 Page.*

(Continued)

*Primary Examiner* — Boris Pesin
*Assistant Examiner* — Ece Hur
(74) *Attorney, Agent, or Firm* — Fish & Richardson P.C.

(57) ABSTRACT

Methods, systems, and apparatus, including computer program products, for presenting a user interface element. Movement of a user interface element that includes first and second pattern layers is detected. While the user interface element is moving, a first pattern layer is translated relative to a second pattern layer.

20 Claims, 4 Drawing Sheets

U.S. PATENT DOCUMENTS

| | | | |
|---|---|---|---|
| 5,598,572 A | 1/1997 | Tanikoshi et al. | |
| 5,628,050 A | 5/1997 | McGraw | |
| 5,636,245 A | 6/1997 | Ernst | |
| 5,642,303 A | 6/1997 | Small | |
| 5,675,362 A | 10/1997 | Clough et al. | |
| 5,684,859 A | 11/1997 | Chanroo et al. | |
| 5,689,252 A | 11/1997 | Ayanoglu et al. | |
| 5,717,392 A | 2/1998 | Eldridge | |
| 5,732,074 A | 3/1998 | Spaur et al. | |
| 5,742,666 A | 4/1998 | Alpert | |
| 5,745,865 A | 4/1998 | Rostoker et al. | |
| 5,758,049 A | 5/1998 | Johnson et al. | |
| 5,760,773 A | 6/1998 | Berman et al. | |
| 5,767,795 A | 6/1998 | Schaphorst | |
| 5,793,630 A | 8/1998 | Theimer | |
| 5,828,374 A * | 10/1998 | Coleman et al. | 715/786 |
| 5,835,061 A | 11/1998 | Stewart | |
| 5,845,227 A | 12/1998 | Peterson | |
| 5,867,110 A | 2/1999 | Naito et al. | |
| 5,870,686 A | 2/1999 | Monson | |
| 5,872,526 A | 2/1999 | Tognazzini | |
| 5,877,766 A * | 3/1999 | Bates et al. | 715/854 |
| 5,883,580 A | 3/1999 | Briancon | |
| 5,893,898 A | 4/1999 | Tanimoto | |
| 5,898,680 A | 4/1999 | Johnstone | |
| 5,905,451 A | 5/1999 | Sakashita | |
| 5,908,465 A | 6/1999 | Ito et al. | |
| 5,910,799 A | 6/1999 | Carpenter | |
| 5,923,861 A * | 7/1999 | Bertram et al. | 715/786 |
| 5,933,100 A | 8/1999 | Golding | |
| 5,938,721 A | 8/1999 | Dussell et al. | |
| 5,946,618 A | 8/1999 | Agre et al. | |
| 5,948,041 A | 9/1999 | Abo et al. | |
| 5,948,061 A | 9/1999 | Merriman et al. | |
| 5,959,577 A | 9/1999 | Fan | |
| 5,969,678 A | 10/1999 | Stewart | |
| 5,987,381 A | 11/1999 | Oshizawa | |
| 6,014,090 A | 1/2000 | Rosen et al. | |
| 6,026,375 A | 2/2000 | Hall et al. | |
| 6,064,335 A | 5/2000 | Eschenbach | |
| 6,069,570 A | 5/2000 | Herring | |
| 6,072,490 A * | 6/2000 | Bates et al. | 715/821 |
| 6,073,013 A | 6/2000 | Agre et al. | |
| 6,073,062 A | 6/2000 | Hoshino et al. | |
| 6,085,148 A | 7/2000 | Jamison | |
| 6,091,956 A | 7/2000 | Hollenberg | |
| 6,091,957 A | 7/2000 | Larkins | |
| 6,101,443 A | 8/2000 | Kato | |
| 6,111,541 A | 8/2000 | Karmel | |
| 6,115,754 A | 9/2000 | Landgren | |
| 6,119,014 A | 9/2000 | Alperovich et al. | |
| 6,122,520 A | 9/2000 | Want et al. | |
| 6,134,548 A | 10/2000 | Gottsman et al. | |
| 6,138,142 A | 10/2000 | Linsk | |
| 6,151,309 A | 11/2000 | Busuioc et al. | |
| 6,157,381 A * | 12/2000 | Bates et al. | 715/786 |
| 6,166,627 A | 12/2000 | Reeley | |
| 6,177,938 B1 * | 1/2001 | Gould | 715/784 |
| 6,185,427 B1 | 2/2001 | Krasner et al. | |
| 6,195,609 B1 | 2/2001 | Pilley et al. | |
| 6,199,014 B1 | 3/2001 | Walker | |
| 6,199,045 B1 | 3/2001 | Giniger et al. | |
| 6,199,099 B1 | 3/2001 | Gershman et al. | |
| 6,202,008 B1 | 3/2001 | Beckert et al. | |
| 6,202,023 B1 | 3/2001 | Hancock et al. | |
| 6,216,086 B1 | 4/2001 | Seymour et al. | |
| 6,236,365 B1 | 5/2001 | LeBlanc et al. | |
| 6,236,933 B1 | 5/2001 | Lang | |
| 6,246,948 B1 | 6/2001 | Thakker | |
| 6,252,544 B1 | 6/2001 | Hoffberg | |
| 6,252,594 B1 * | 6/2001 | Xia et al. | 715/786 |
| 6,256,498 B1 | 7/2001 | Ludwig | |
| 6,259,405 B1 | 7/2001 | Stewart et al. | |
| 6,266,614 B1 | 7/2001 | Alumbaugh | |
| 6,266,615 B1 | 7/2001 | Jin | |
| 6,278,884 B1 | 8/2001 | Kim | |
| 6,298,306 B1 | 10/2001 | Suarez et al. | |
| 6,321,158 B1 | 11/2001 | DeLorme et al. | |
| 6,323,846 B1 | 11/2001 | Westerman et al. | |
| 6,324,692 B1 | 11/2001 | Fiske | |
| 6,326,918 B1 | 12/2001 | Stewart | |
| 6,339,437 B1 * | 1/2002 | Nielsen | 715/787 |
| 6,343,317 B1 | 1/2002 | Glorikian | |
| 6,345,288 B1 | 2/2002 | Reed et al. | |
| 6,353,398 B1 | 3/2002 | Amin et al. | |
| 6,353,743 B1 | 3/2002 | Karmel | |
| 6,353,837 B1 | 3/2002 | Blumenau | |
| 6,356,761 B1 | 3/2002 | Huttunen | |
| 6,370,629 B1 | 4/2002 | Hastings et al. | |
| 6,377,886 B1 | 4/2002 | Gotou | |
| 6,401,032 B1 | 6/2002 | Jamison | |
| 6,405,123 B1 | 6/2002 | Rennar et al. | |
| 6,414,635 B1 | 7/2002 | Stewart et al. | |
| 6,415,227 B1 | 7/2002 | Lin | |
| 6,452,498 B2 | 9/2002 | Stewart | |
| 6,456,234 B1 | 9/2002 | Johnson | |
| 6,477,581 B1 | 11/2002 | Carpenter | |
| 6,490,519 B1 | 12/2002 | Lapidot et al. | |
| 6,501,421 B1 | 12/2002 | Dutta et al. | |
| 6,505,046 B1 | 1/2003 | Baker | |
| 6,505,123 B1 | 1/2003 | Root et al. | |
| 6,564,143 B1 | 5/2003 | Alewine et al. | |
| 6,570,557 B1 | 5/2003 | Westerman et al. | |
| 6,571,279 B1 | 5/2003 | Herz et al. | |
| 6,574,484 B1 | 6/2003 | Carley | |
| 6,587,835 B1 | 7/2003 | Treyz et al. | |
| 6,611,687 B1 | 8/2003 | Clark et al. | |
| 6,615,131 B1 | 9/2003 | Rennard et al. | |
| 6,615,213 B1 | 9/2003 | Johnson | |
| 6,647,257 B2 | 11/2003 | Owensby | |
| 6,677,894 B2 | 1/2004 | Sheynblat et al. | |
| 6,679,932 B2 | 1/2004 | Birler et al. | |
| 6,681,120 B1 | 1/2004 | Kim | |
| 6,697,018 B2 | 2/2004 | Stewart | |
| 6,711,474 B1 | 3/2004 | Treyz et al. | |
| 6,714,221 B1 * | 3/2004 | Christie et al. | 715/784 |
| 6,731,236 B1 | 5/2004 | Hager et al. | |
| 6,731,238 B2 | 5/2004 | Johnson | |
| 6,741,188 B1 | 5/2004 | Miller et al. | |
| 6,748,318 B1 | 6/2004 | Jones | |
| 6,759,960 B2 | 7/2004 | Stewart | |
| 6,795,686 B2 | 9/2004 | Master et al. | |
| 6,810,323 B1 | 10/2004 | Bullock et al. | |
| 6,816,782 B1 | 11/2004 | Walters et al. | |
| 6,845,318 B1 | 1/2005 | Moore et al. | |
| 6,847,891 B2 | 1/2005 | Pietras et al. | |
| 6,853,911 B1 | 2/2005 | Sakarya | |
| 6,853,917 B2 | 2/2005 | Miwa | |
| 6,868,074 B1 | 3/2005 | Hanson | |
| 6,888,536 B2 | 5/2005 | Westerman et al. | |
| 6,912,398 B1 | 6/2005 | Domnitz | |
| 6,944,447 B2 | 9/2005 | Portman et al. | |
| 6,948,656 B2 | 9/2005 | Williams | |
| 6,952,181 B2 | 10/2005 | Karr et al. | |
| 6,954,735 B2 | 10/2005 | Djupsjobacka et al. | |
| 6,975,959 B2 | 12/2005 | Dietrich et al. | |
| 6,980,909 B2 | 12/2005 | Root et al. | |
| 7,009,556 B2 | 3/2006 | Stewart | |
| 7,044,372 B2 | 5/2006 | Okuda et al. | |
| 7,058,594 B2 | 6/2006 | Stewart | |
| 7,082,365 B2 | 7/2006 | Sheha et al. | |
| 7,096,030 B2 | 8/2006 | Huomo | |
| 7,103,470 B2 | 9/2006 | Mintz | |
| 7,117,015 B2 | 10/2006 | Scheinert et al. | |
| 7,123,189 B2 | 10/2006 | Lalik et al. | |
| 7,165,725 B2 | 1/2007 | Casey | |
| 7,187,997 B2 | 3/2007 | Johnson | |
| 7,256,711 B2 | 8/2007 | Sheha et al. | |
| 7,257,392 B2 | 8/2007 | Tang et al. | |
| 7,298,327 B2 | 11/2007 | Dupray et al. | |
| 7,310,516 B1 | 12/2007 | Vacanti et al. | |
| 7,325,204 B2 * | 1/2008 | Rogers | 715/792 |
| 7,339,496 B2 | 3/2008 | Endo et al. | |
| 7,343,564 B2 | 3/2008 | Othmer | |
| 7,349,706 B2 | 3/2008 | Kim et al. | |
| 7,359,713 B1 | 4/2008 | Tiwari | |
| 7,370,283 B2 | 5/2008 | Othmer | |

| Patent No. | Date | Name | | Pub. No. | Date | Name | |
|---|---|---|---|---|---|---|---|
| 7,386,396 B2 | 6/2008 | Johnson | | 2006/0229802 A1 | 10/2006 | Vertelney et al. | |
| 7,427,021 B2 | 9/2008 | Kemper et al. | | 2006/0237385 A1 | 10/2006 | Williamson et al. | |
| 7,460,130 B2* | 12/2008 | Salganicoff | 345/590 | 2006/0284767 A1 | 12/2006 | Taylor | |
| 7,500,607 B2 | 3/2009 | Williams | | 2006/0287824 A1 | 12/2006 | Lin | |
| 7,525,484 B2 | 4/2009 | Dupray et al. | | 2006/0291666 A1* | 12/2006 | Ball et al. | 381/58 |
| 7,813,591 B2* | 10/2010 | Paley et al. | 382/285 | 2007/0001875 A1 | 1/2007 | Taylor | |
| 7,831,054 B2* | 11/2010 | Ball et al. | 381/104 | 2007/0005188 A1 | 1/2007 | Johnson | |
| 7,836,408 B1* | 11/2010 | Ollmann et al. | 715/787 | 2007/0005233 A1 | 1/2007 | Pinkus et al. | |
| 2001/0018349 A1 | 8/2001 | Kinnunen et al. | | 2007/0010942 A1 | 1/2007 | Bill | |
| 2002/0035493 A1 | 3/2002 | Mozayeny et al. | | 2007/0016362 A1 | 1/2007 | Nelson | |
| 2002/0035609 A1 | 3/2002 | Lessard et al. | | 2007/0042790 A1 | 2/2007 | Mohi et al. | |
| 2002/0042266 A1 | 4/2002 | Heyward et al. | | 2007/0055684 A1 | 3/2007 | Steven | |
| 2002/0046069 A1 | 4/2002 | Mozayeny et al. | | 2007/0061245 A1 | 3/2007 | Ramer et al. | |
| 2002/0046077 A1 | 4/2002 | Mozayeny et al. | | 2007/0061363 A1 | 3/2007 | Ramer et al. | |
| 2002/0046084 A1 | 4/2002 | Steele et al. | | 2007/0073480 A1 | 3/2007 | Singh | |
| 2002/0091991 A1 | 7/2002 | Castro | | 2007/0073719 A1 | 3/2007 | Ramer et al. | |
| 2002/0140560 A1 | 10/2002 | Altman et al. | | 2007/0093258 A1 | 4/2007 | Steenstra et al. | |
| 2002/0160815 A1 | 10/2002 | Patel et al. | | 2007/0106465 A1 | 5/2007 | Adam et al. | |
| 2002/0167442 A1 | 11/2002 | Taylor | | 2007/0115868 A1 | 5/2007 | Chen et al. | |
| 2003/0069683 A1 | 4/2003 | Lapidot et al. | | 2007/0124043 A1 | 5/2007 | Ayoub et al. | |
| 2003/0100326 A1 | 5/2003 | Grube et al. | | 2007/0124066 A1 | 5/2007 | Kikuchi | |
| 2003/0101225 A1 | 5/2003 | Han et al. | | 2007/0127439 A1 | 6/2007 | Stein | |
| 2003/0134657 A1 | 7/2003 | Norta et al. | | 2007/0129888 A1 | 6/2007 | Rosenberg | |
| 2003/0144793 A1 | 7/2003 | Melaku et al. | | 2007/0130153 A1 | 6/2007 | Nachman et al. | |
| 2003/0236106 A1 | 12/2003 | Master et al. | | 2007/0135136 A1 | 6/2007 | Ische | |
| 2004/0036649 A1 | 2/2004 | Taylor | | 2007/0135990 A1 | 6/2007 | Seymour et al. | |
| 2004/0054428 A1 | 3/2004 | Sheha et al. | | 2007/0149212 A1 | 6/2007 | Gupta et al. | |
| 2004/0128067 A1 | 7/2004 | Smith | | 2007/0150320 A1 | 6/2007 | Huang | |
| 2004/0151151 A1 | 8/2004 | Kubler et al. | | 2007/0153983 A1 | 7/2007 | Bloebaum et al. | |
| 2004/0158401 A1 | 8/2004 | Yoon | | 2007/0153984 A1 | 7/2007 | Bloebaum et al. | |
| 2004/0158584 A1 | 8/2004 | Necsoiu et al. | | 2007/0153986 A1 | 7/2007 | Bloebaum et al. | |
| 2004/0172409 A1 | 9/2004 | James | | 2007/0156326 A1 | 7/2007 | Nesbitt | |
| 2004/0176907 A1 | 9/2004 | Nesbitt | | 2007/0179854 A1 | 8/2007 | Ziv et al. | |
| 2004/0198379 A1 | 10/2004 | Magee et al. | | 2007/0204218 A1 | 8/2007 | Weber et al. | |
| 2004/0203836 A1 | 10/2004 | Gorday et al. | | 2007/0206730 A1 | 9/2007 | Polk | |
| 2004/0203909 A1 | 10/2004 | Koster | | 2007/0219706 A1 | 9/2007 | Sheynblat | |
| 2004/0228330 A1 | 11/2004 | Kubler et al. | | 2007/0232326 A1 | 10/2007 | Johnson | |
| 2004/0236504 A1 | 11/2004 | Bickford et al. | | 2007/0233387 A1 | 10/2007 | Johnson | |
| 2004/0242149 A1 | 12/2004 | Luneau | | 2007/0254676 A1 | 11/2007 | Pedigo et al. | |
| 2004/0246940 A1 | 12/2004 | Kubler et al. | | 2007/0260751 A1 | 11/2007 | Meesseman | |
| 2004/0248586 A1 | 12/2004 | Patel et al. | | 2007/0271328 A1 | 11/2007 | Geelen et al. | |
| 2004/0260939 A1 | 12/2004 | Ichikawa et al. | | 2007/0276586 A1 | 11/2007 | Jeon et al. | |
| 2004/0264442 A1 | 12/2004 | Kubler et al. | | 2007/0276587 A1 | 11/2007 | Johnson | |
| 2005/0002419 A1 | 1/2005 | Doviak et al. | | 2007/0276596 A1 | 11/2007 | Solomon et al. | |
| 2005/0004838 A1 | 1/2005 | Perkowski et al. | | 2007/0282521 A1 | 12/2007 | Broughton | |
| 2005/0027442 A1 | 2/2005 | Kelley et al. | | 2007/0299601 A1 | 12/2007 | Zhao et al. | |
| 2005/0039140 A1* | 2/2005 | Chen | 715/810 | 2008/0004802 A1 | 1/2008 | Horvitz | |
| 2005/0071702 A1* | 3/2005 | Morisawa | 713/320 | 2008/0005104 A1 | 1/2008 | Flake et al. | |
| 2005/0085272 A1 | 4/2005 | Anderson et al. | | 2008/0005301 A1 | 1/2008 | Li et al. | |
| 2005/0096840 A1 | 5/2005 | Simske | | 2008/0015422 A1 | 1/2008 | Wessel | |
| 2005/0097471 A1* | 5/2005 | Faraday et al. | 715/723 | 2008/0021632 A1 | 1/2008 | Amano | |
| 2005/0114021 A1 | 5/2005 | Krull et al. | | 2008/0024360 A1 | 1/2008 | Taylor | |
| 2005/0134578 A1* | 6/2005 | Chambers et al. | 345/184 | 2008/0024364 A1 | 1/2008 | Taylor | |
| 2005/0149250 A1 | 7/2005 | Isaac | | 2008/0027636 A1 | 1/2008 | Tengler et al. | |
| 2005/0153681 A1 | 7/2005 | Hanson | | 2008/0030308 A1 | 2/2008 | Johnson | |
| 2005/0197767 A1 | 9/2005 | Nortrup | | 2008/0032703 A1 | 2/2008 | Krumm et al. | |
| 2005/0221808 A1 | 10/2005 | Karlsson et al. | | 2008/0045234 A1 | 2/2008 | Reed | |
| 2005/0221843 A1 | 10/2005 | Friedman et al. | | 2008/0052407 A1 | 2/2008 | Baudino et al. | |
| 2005/0222756 A1 | 10/2005 | Davis et al. | | 2008/0070593 A1 | 3/2008 | Altman et al. | |
| 2005/0227709 A1 | 10/2005 | Chang et al. | | 2008/0071466 A1 | 3/2008 | Downs et al. | |
| 2005/0228860 A1 | 10/2005 | Hamynen et al. | | 2008/0082254 A1 | 4/2008 | Huhtala et al. | |
| 2005/0239477 A1 | 10/2005 | Kim et al. | | 2008/0085727 A1 | 4/2008 | Kratz | |
| 2005/0250440 A1 | 11/2005 | Zhou et al. | | 2008/0086240 A1 | 4/2008 | Breed | |
| 2005/0286421 A1 | 12/2005 | Janacek | | 2008/0091347 A1 | 4/2008 | Tashiro | |
| 2006/0015249 A1 | 1/2006 | Gieseke | | 2008/0091635 A1* | 4/2008 | James et al. | 706/924 |
| 2006/0022048 A1 | 2/2006 | Johnson | | 2008/0097698 A1 | 4/2008 | Arnold-Huyser et al. | |
| 2006/0025158 A1 | 2/2006 | Leblanc et al. | | 2008/0098090 A1 | 4/2008 | Geraci et al. | |
| 2006/0041377 A1 | 2/2006 | Jung et al. | | 2008/0104634 A1 | 5/2008 | Gajdos et al. | |
| 2006/0041378 A1 | 2/2006 | Cheng et al. | | 2008/0109153 A1 | 5/2008 | Gueziec | |
| 2006/0058955 A1 | 3/2006 | Mehren | | 2008/0113672 A1 | 5/2008 | Karr et al. | |
| 2006/0085392 A1 | 4/2006 | Wang et al. | | 2008/0129528 A1 | 6/2008 | Guthrie | |
| 2006/0094353 A1 | 5/2006 | Neilson et al. | | 2008/0132243 A1 | 6/2008 | Spalink et al. | |
| 2006/0111122 A1 | 5/2006 | Carlsan et al. | | 2008/0132251 A1 | 6/2008 | Altman et al. | |
| 2006/0180649 A1 | 8/2006 | Casey | | 2008/0132252 A1 | 6/2008 | Altman et al. | |
| 2006/0184978 A1 | 8/2006 | Casey | | 2008/0140308 A1 | 6/2008 | Yamane et al. | |
| 2006/0195481 A1 | 8/2006 | Arrouye et al. | | 2008/0140520 A1 | 6/2008 | Hyder et al. | |
| 2006/0202819 A1 | 9/2006 | Adamczyk et al. | | 2008/0153512 A1 | 6/2008 | Kale et al. | |
| 2006/0211453 A1 | 9/2006 | Schick | | 2008/0153513 A1 | 6/2008 | Flake et al. | |
| 2006/0218209 A1 | 9/2006 | Arrouye et al. | | 2008/0155453 A1 | 6/2008 | Othmer | |

| | | | | | | |
|---|---|---|---|---|---|---|
| 2008/0161034 | A1 | 7/2008 | Akiyama | JP | 2003-228532 | 8/2003 |
| 2008/0167083 | A1 | 7/2008 | Wyld et al. | JP | 2004-045054 | 2/2004 |
| 2008/0167811 | A1 | 7/2008 | Geelen | JP | 2004-219146 | 7/2004 |
| 2008/0172173 | A1 | 7/2008 | Chang et al. | JP | 2004-362271 | 12/2004 |
| 2008/0172374 | A1 | 7/2008 | Wolosin et al. | JP | 2005-106741 | 4/2005 |
| 2008/0176545 | A1 | 7/2008 | Dicke et al. | JP | 2005-182146 | 7/2005 |
| 2008/0177793 | A1 | 7/2008 | Epstein et al. | JP | 2005-241519 | 9/2005 |
| 2008/0178116 | A1* | 7/2008 | Kim ............... 715/786 | JP | 2006-112338 | 4/2006 |
| 2008/0189033 | A1 | 8/2008 | Geelen et al. | JP | 2006-184007 | 7/2006 |
| 2008/0249667 | A1 | 10/2008 | Horvitz et al. | JP | 2006-270889 | 10/2006 |
| 2008/0271072 | A1 | 10/2008 | Rothschild et al. | JP | 2006-279838 | 10/2006 |
| 2008/0318550 | A1 | 12/2008 | DeAtley | JP | 2007-033220 | 2/2007 |
| 2009/0003659 | A1 | 1/2009 | Forstall et al. | JP | 2007-033331 | 2/2007 |
| 2009/0005005 | A1 | 1/2009 | Forstall et al. | JP | 2007-033368 | 2/2007 |
| 2009/0005018 | A1 | 1/2009 | Forstall et al. | JP | 2007-127439 | 5/2007 |
| 2009/0005021 | A1 | 1/2009 | Forstall et al. | JP | 2007-147439 | 6/2007 |
| 2009/0005068 | A1 | 1/2009 | Forstall et al. | JP | 2007-201699 | 8/2007 |
| 2009/0005070 | A1 | 1/2009 | Forstall et al. | JP | 2007-240400 | 9/2007 |
| 2009/0005071 | A1 | 1/2009 | Forstall et al. | JP | 2007-259291 | 10/2007 |
| 2009/0005072 | A1 | 1/2009 | Forstall et al. | JP | 2007-271299 | 10/2007 |
| 2009/0005076 | A1 | 1/2009 | Forstall et al. | JP | 2007-304009 | 11/2007 |
| 2009/0005080 | A1 | 1/2009 | Forstall et al. | JP | 2008-058917 | 3/2008 |
| 2009/0005082 | A1 | 1/2009 | Forstall et al. | JP | 2008-129774 | 6/2008 |
| 2009/0005964 | A1 | 1/2009 | Forstall et al. | KR | 2004-102440 | 12/2004 |
| 2009/0005965 | A1 | 1/2009 | Forstall et al. | KR | 2005-096746 | 10/2005 |
| 2009/0005975 | A1 | 1/2009 | Forstall et al. | TW | 200426387 | 12/2004 |
| 2009/0005978 | A1 | 1/2009 | Forstall et al. | WO | WO 93/20546 | 10/1993 |
| 2009/0005981 | A1 | 1/2009 | Forstall et al. | WO | WO 97/07467 | 2/1997 |
| 2009/0006336 | A1 | 1/2009 | Forstall et al. | WO | WO 97/24577 | 7/1997 |
| 2009/0030605 | A1 | 1/2009 | Breed | WO | WO 98/03951 | 1/1998 |
| 2009/0031006 | A1 | 1/2009 | Johnson | WO | WO 98/07112 | 2/1998 |
| 2009/0033540 | A1 | 2/2009 | Breed et al. | WO | WO 98/54682 | 12/1998 |
| 2009/0098857 | A1 | 4/2009 | DeAtley | WO | WO 99/16036 | 4/1999 |
| 2009/0177385 | A1 | 7/2009 | Matas et al. | WO | WO 99/44183 | 9/1999 |
| 2009/0182492 | A1 | 7/2009 | Alten | WO | WO 01/37597 | 5/2001 |
| 2009/0259573 | A1 | 10/2009 | Cheng et al. | WO | WO 02/054813 | 7/2002 |
| 2009/0271271 | A1 | 10/2009 | Johnson | WO | WO 03/23593 | 3/2003 |
| 2009/0273574 | A1* | 11/2009 | Pryor ............... 345/173 | WO | WO 2004/008792 | 3/2003 |
| 2009/0281724 | A1 | 11/2009 | Blumenberg et al. | WO | WO 03/096055 | 11/2003 |
| 2009/0286549 | A1 | 11/2009 | Sazegari et al. | WO | WO 2004/021730 | 3/2004 |
| | | | | WO | WO 2004/061576 | 7/2004 |
| | | FOREIGN PATENT DOCUMENTS | | WO | WO 2004/076977 | 9/2004 |
| | | | | WO | WO 2005/006258 | 1/2005 |
| CA | | 2163215 | 5/1994 | WO | WO 2006/065856 | 6/2006 |
| CA | | 2287596 | 4/2000 | WO | WO 2006/113125 | 10/2006 |
| CA | | 2432239 | 12/2004 | WO | WO 2007/052285 | 5/2007 |
| DE | | 4437360 | 4/1996 | WO | WO 2008/051929 | 5/2008 |
| DE | | 19506890 | 8/1996 | WO | WO 2008/085740 | 7/2008 |
| DE | | 19914257 | 3/1999 | WO | WO 2009/140031 | 11/2009 |
| DE | | 10 141 695 | 3/2003 | | | |
| EP | | 785535 | 7/1997 | | | |
| EP | | 0 809 117 | 11/1997 | | | |
| EP | | 0 699 330 | 4/1998 | | | |
| EP | | 0 908 835 | 4/1999 | | | |
| EP | | 0 997 808 | 5/2000 | | | |
| EP | | 1 300 652 | 4/2003 | | | |
| EP | | 1 457 928 | 9/2004 | | | |
| EP | | 1 469 287 | 10/2004 | | | |
| EP | | 1 496 338 | 1/2005 | | | |
| EP | | 1 770 956 | 9/2005 | | | |
| EP | | 1 465 041 | 2/2006 | | | |
| EP | | 1 659 817 | 5/2006 | | | |
| EP | | 1 790 947 | 5/2007 | | | |
| EP | | 1 860 904 | 11/2007 | | | |
| FR | | 2730083 | 8/1996 | | | |
| FR | | 2272911 | 6/1999 | | | |
| FR | | 2810183 | 12/2001 | | | |
| GB | | 2 359 888 | 5/2001 | | | |
| GB | | 2 407 230 | 4/2005 | | | |
| JP | | 62142215 | 6/1987 | | | |
| JP | | 05-071974 | 3/1993 | | | |
| JP | | 06-525189 | 5/1994 | | | |
| JP | | 2007-221433 | 5/1994 | | | |
| JP | | 9-062993 | 7/1997 | | | |
| JP | | 9-210710 | 8/1997 | | | |
| JP | | 11-234736 | 8/1999 | | | |
| JP | | 2000-163379 | 6/2000 | | | |
| JP | | 2001-160063 | 6/2001 | | | |
| JP | | 2002-310680 | 10/2002 | | | |
| JP | | 10-030933 | 2/2003 | | | |

OTHER PUBLICATIONS

Budka et al., "A Bayesian method to Improve Mobile Geolocation Accuracy", IEEE, 2002, pp. 1021-1025.

Yamamoto et al., "Position Location Technologies Using Signal Strength in Cellular Systems", IEEE, 2001, pp. 2570-2575.

International Search Report and Written Opinion, dated Oct. 1, 2009, issued in PCT/US2009/041298.

"27 Countries in your pocket"; [online] [Retrieved on Sep. 29, 2005] Retrieved from the Internet <URL: http://www.mio-tech.be/en/printview/press-releases-2005-09-29.htm; 1 page.

"Animated Transition"; [online] [Retrieved on Oct. 16, 2006] Retrieved from the Internet <URL: http://designinterfaces.com/Animated_Transition; 2 pages.

"DaimlerCrysler Guide5 Usecases Overview Map", 1 page (no reference date).

"International Roaming Guide—Personal Experience(s) from Customer and Community Member"; [online] [Retrieved Jun. 26, 2006] Retrieved from the Internet <URL: http://forums.cingular.com/cng/board/message?board.id=1185; 6 pages.

"iPhone Software/Hardware Hack: LocoGPS—GPS Add-on for the iPhone"; [online] [Retrieved on Dec. 25, 2007] Retrieved from the Internet <URL: http://www.iphonehacks.com/iphone_applications/index.html; 41 pages.

"Mio 269+ Users Manula"; 2005; 44 pages.

"New program for mobile blogging for PocketPC released: MY BLOG"; [online] [Retrieved on Apr. 5, 2006]; Retrieved from the Internet, URL: http://msmobiles.com/news.php/4067.html.

"Numbering and Dialing Plan within the United States", Alliance for Telecommunications Industry Solutions; 2005; 17 pages.

Review Guide—Google Maps for mobile (beta); Google; 2006; 7 pages.

"User-centered design of mobile solutions", Namahn, 2006, 18 pages.

"User's Manual MioMap 2.0"; Aug. 2005; 60 pages.

"Windows Live Search for Mobile Goes Final, Still Great"; [online] [Retrieved on Mar. 11, 2007]; Retrieved from the Internet, URL: http://gizmodo.com/gadgets/software/windows-live-search-for-mobile-goes-final-still-great-236002.php; 3 pages.

"Windows Mobile 6 Professional Video Tour"; [online] [Retrieved on Mar. 11, 2007]; Retrieved from the Internet, URL: http://gizmodo.com/gadgets/cellphones/windows-mobile-6-professional-video-tour-237039.php; 4 pages.

"Windows Mobile"; Microsoft; 2007, 2 pages.

Anand et al., "Quantitative Analysis of Power Consumption for Location-Aware Applications on Smart Phones", IEEE International Symposium on Industrial Electronics, 2007.

Balliet, "Transportation Information Distribution System", IBM Technical Disclosure Bulletin, [online] [Retrieved Nov. 7, 2008] Retrieved from the Internet, URL: https://www.delphion.com/tdbs/tdb?order=86A+61395; Jun. 1986; 2 pages.

Beard et al., "Estimating Positions and Paths of Moving Objects", IEEE 2000, pp. 1-8.

Bederson, B.B., Audio Augmented Reality: A Prototype Automated Tour Guide [online] [retrieved on Aug. 30, 2002] [retrieved from http://www.cs.umd.edu/~bederson/papers/chi-95-aar/] pp. 1-4.

Berman et al., "The Role of Dead Reckoning and Inertial Sensors in Future General Aviation Navigation", IEEE, 1998, pp. 510-517.

Bevly et al., "Cascaded Kalman Filters for Accurate Estimation of Multiple Biases, Dead-Reckoning Navigation, and Full State Feedback Control of Ground Vehicles", IEEE Transactions on Control Systems in Technology, vol. 15, No. 2, Mar. 2007, pp. 199-208.

Binzhuo et al., "Mobile Phone GIS Based on Mobile SVG", IEEE 2005.

Bokharouss et al., "A Location-Aware Mobile Call Handling Assistant", International Conference on Advanced Information Networking and Applications Workshops, 2007.

Boonsrimuang et al., "Mobile Internet Navigation System", IEEE, 2002, pp. 325-328.

Camp et al., "A computer-based method for predicting transit time systems", Decsision Sciences, vol. 5, pp. 339-346, 1974.

Carew; "Phones that tell you where to drive, meet, eat"; [online] [Retrieved May 26, 2007]; Retrieved from the Internet <URL httlp://news.yahoo.com/s/nm/20070525/wr_nm/column_pluggedin_dc_2&printer=1;_ylt=Ahqaftn7xmlS2r0FZFeu9G4ht.cA; 2 pages.

Charny, "AT&T puts 411 to the text"; [online] [Retrieved Mar. 4, 2009]; Retrieved from the Internet <URL http://news.cnet.com/ATT-puts-411-to-the-text/2100-1039_3-1000669.html; May 8, 2003; 2 pages.

Cho et al., A Traveler Information Service Structure in Hybrid T-DMB and Cellular Communication Network, Broadcast Systems Research Group, IEEE, 2006, pp. 747-750.

Christie et al., "Development and Deployment of GPS wireless devices for E911 and Location based services", IEEE 2002.

Chua et al., "Intelligent Portal for Event-triggered SMS Alerts", 2nd International Conference on Mobile Technology, Applications and Systems, 2005.

Civilis et al., "Efficient Tracking of Moving Objects with Precision Guarantees", IEEE, Proceedings of the First Annual International Conference on Mobile and Ubiquitous Systems: Networking and Services, 2004, 10 pages.

Dibdin, Peter, "Where are mobile location based services?", Dec. 14, 2001, pp. 1-8.

Dunn et al., "Wireless Emergency Call System", IBM TDB, Sep. 1994.

Ebine, "Dual Frequency resonant base station antennas for PDC systems in Japan", IEEE, pp. 564-567, 1999.

Evans, "In-Vehicle Man-Machine Interaction the Socrates Approach", Vehicle Navigation & Information System Conference Proceedings, 1994, Aug. 31-Sep. 2, 1994, pp. 473-477.

FM 3-25.26 Map Reading and Land Navigation Field Manual No. 3-25.26, Headquarters Department of the Army, Washington, DC [online] [retrieved on Apr. 9, 2004] [retrieved from http://155.217.58.58/cgi-bin/atdl.dll/fm/3-25.26/toc.htm] Jul. 20, 2001, pp. 1-7 and J-1 to J-3.

*GPS 12 Personal Navigator Owner's Manual & Reference*, Garmin Corporation, Jan. 1999, pp. 1-60.

Guo et al., "An Intelligent Query System based on Chinese Short Message Service for Restaurant Recommendation", IEEE 2007, 1 page.

Hameed et al., "An Intelligent Agent-Based Medication and Emergency System", IEEE 2006.

Helal et al., "Drishti: An Integrated Navigation System for Visually Impaired and Disabled", Fifth International Symposium on Wearable Computers (ISWC'01), IEEE, 2001, pp. 149-156.

Hohman et al., "GPS Roadside Integrated Precision Positioning System", Position Location and Navigation Symposium (IEEE 2000), pp. 221-230.

International Numbering and SMS—Type of Numbering, TON, Numbering Plan Indicator, NPI, [online] [Retrieved Jan. 5, 2007] Retrieved from the Internet <URL: http://www.activeexperts.com/support/activsms/tonnpi/.

Jain, R., Potential Networking Applications of Global Positioning Systems (GPS) [online] [retrieved on Nov. 18, 2008] [retrieved from http://arxiv.org/ftp/cs/papers/9809/9809079.pdf] OSU Technical Report TR-24, Apr. 1996, pp. 1-40.

Jirawimut et al., "A Method for Dead Reckoning Parameter Correction in Pedestrian Navigation System", IEEE Transactions on Instrumentation and Measurement, vol. 52, No. 1, Feb. 2003, pp. 209-215.

Ju et al., "RFID Data Collection and Integration based on Mobile Agent", IEEE, 2006.

Kbar et al., "Mobile Station Location based on Hybrid of Signal Strength and Time of Arrival", IEEE, 2005.

Koide et al., "3-D Human Navigation System with Consideration of Neighboring Space Information", IEEE International Conference on Systems, Man and Cybernetics, 2006 (SMC '06), vol. 2, (Oct. 8-11, 2006), pp. 1693-1698.

Lloyd et al., "Cellular phone base stations installation violate the Electromagnetic Compatibility regulations", IEEE, 2004.

Manabe et al., "On the M-CubITS Pedestrian Navigation System", IEEE, 2006, pp. 793-798.

Meier et al., "Location-Aware Event-Base Middleware: A Paradigm for Collaborative Mobile Applications?", Sep. 2003.

Miller et al., "Synchronization of Mobile XML Databases by Utilizing Deferred Views", IEEE 2004.

Nardi et al., "Integrating Communication and Information through Contact Map", Communications of the ACM, vol. 45, No. 4, Apr. 2002.

Navizon Peer-to-Peer Wireless Positioning; [online] [Retrieved on Nov. 30, 2007]; Retrieved from the Internet, URL: httpl//www.navizon.com/; 2 pages.

Northard, "Docking Station Communication Link", IBM TDB, Feb. 1994.

Oh et al., "Spatial Applications Using 4S Technology for Mobile Environment", IEEE 2002.

Paksoy et al., "The Global Position System—Navigation Tool of the Future", Journal of Electrical & Electronics, 2002, vol. 2, No. 1, pp. 467-476.

Parikh, "Tele Locate", IBM Technical Disclosure Bulletin, [online] [Retrieved Nov. 7, 2008] Retrieved from the Internet, URL: https://www.delphion.com/tdbs/tdb?order=92A+62775; Sep. 1992; 1 page.

Partial International Search Report, dated Jul. 29, 2008, issued in corresponding PCT/US2008/050295.

International Search Report and Written Opinion, dated Jun. 9, 2008, issued in Interntiaonal Application No. PCT/US2007/088880, filed Dec. 27, 2007.

Pfoser et al., "Dynamic Travel Time Maps—Enabling Efficient Navigation", Proceedings of the 18th International Conference on Scientific and Statistical Database Management (SSDBM'06), IEEE, 10 pages.

Portfolio 2007; [online] [Retrieved on Jun. 14, 2007]; Retrieved from the Internet, URL: http://eric.wahlforss.com/folio; 3 pages.

RD 409052, Research Disclosure Alerting Abstract, "Location dependent information for satellite based vehicle communication—required application of Global Position System (GPS) to automatically extract relevant portions of data package as vehicle changes position," May 10, 1998, 1 page.

Rekimoto, J., *Augment-able Reality: Situated Communication through Physical and Digital Spaces*, iswc, pp. 68, Second International Symposium on Wearable computers (ISWC'98), 1998, pp. 1-8.

Rogers et al., "Adaptive User Interfaces for Automotive Environments", IEEE Intelligent Vehicles Symposium 2000, Oct. 3-5, 2000, pp. 662-667.

Rozier, J., *Hear & There: An Augmented Reality System of Linked Audio*, Proceedings of the International Conference on Auditory Display, Atlanta, GA, Apr. 2000, pp. 1-6.

Samadani et al., "PathMaker: Systems for Capturing Trips", IEEE (2004) International Conference on Multimedia and Expo., Publication Date: Jun. 27-30, 2004, vol. 3, pp. 2123-2126, 2004.

Schreiner, "Where We At? Mobile Phones Bring GPS to the Masses", IEEE Computers Society, May/Jun. 2007, pp. 6-11.

Spohrer. "New Paradigms for Using Computers", 1997; retrieved from the Internet, URL: <http://almaden.ibm.com/npuc97/1997/spohrer.htm>.

Sung et al., "Towards Reliable Peer-to-Peer Data Sharing over Mobile Ad hoc Networks", IEEE, 2005.

Weiss et al., "Zone services—An approach for location-based data collection", Proceedings of the 8th International Conference on E-commerce Technology and the 3rd IEEE International Conference on Enterprise Computing, E-Commerce and E-Services (8 pages), 2006.

Yang et al., "A Mutlimedia System for Route Sharing and Video-based Navigation", IEEE, 2006, pp. 73-76.

Yang et al., "A Mutlimedia System for Route Sharing and Video-based Navigation", IEEE, 2006, pp. 73-76.

Yang et al. "Global Snapshots for Distributed Debugging", IEEE, pp. 436-440, 1992.

Yanyan et al., "The model of optimum route selection in vehicle automatic navigation system based on unblocked reliability analyses", IEEE 2003.

"Cyberguide: a mobile context-aware tour guide", Wireless Networks Archive (Special Issue: Mobile computing and networking; selecting papers from MobiCom '96), 3(5):421-433, 1997.

"Frontiers in electronic media", Interactions Archive 4(4):32-64, 1997.

"Location-aware mobile applications based on directory services", International Conference on Mobile Computing and Networking Archive, Proceedings on the 3rd Annual ACM/IEEE International Conference on Mobile Computing and Networking, Budapest, Hungary, pp. 23-33, 1997.

Sharpe et al., U.S. Appl. No. 12/434,586, filed May 1, 2009.
Sharpe et al., U.S. Appl. No. 12/434,582, filed May 1, 2009.
Van Os et al., U.S. Appl. No. 12/165,413, filed Jun. 30, 2008.
Blumenberg et al., U.S. Appl. No. 12/119,316, filed May 12, 2008.
Low et al., U.S. Appl. No. 12/233,358, filed Sep. 18, 2008.
Sazegari et al., U.S. Appl. No. 12/122,339, filed May 16, 2008.
Johnson, U.S. Appl. No. 12/044,363, filed Mar. 7, 2008.
Johnson, U.S. Appl. No. 11/827,065, filed Jul. 10, 2007.
Herz, U.S. Appl. No. 12/270,814, filed Nov. 13, 2008.

Drane et al., "The accurate location of mobile telephones", Third Annual World Congress on Intelligent Transport Systems, Orlando, Florida, Oct. 1996.

"Travel Time Data Collection Handbook—Chapter 5: Its Probe Vehicle Techniques", FHWA-PL-98-035 Report, Department of Transport, University of Texas, Mar. 1998; [online] [Retrieved from the Internet at http://www.fhwa.dot.gov/ohim/handbook/chap5.pdf.

Ygnace et al., "Travel Time Estimation on the San Francisco Bay Area Network Using Cellular Phones as Probes", Working Paper, Institute of Transportation Studies, University of California, Berkeley, 2000.

Wang et al., "A Unified Vehicle Supervising and Traffic Information System", IEEE, 1996, pp. 968-972.

Weiss et al., "Zone services—An approach for location-based data collection", Proceedings of the 8th International Conference on E-commerce Technology and the 3rd IEEE International Conference on Enterprise Computing, E-Commerce and E-Services, 2006; 8 pages.

Dalrymple, "Google Maps adds locator, but not for iPhone," [online] [Retrieved Nov. 30, 2007]; Retrieved from the Internet URL: http://news.yahoo.com/s/macworld/20071130/tc_macworld/googlemaps20071130_0&printer=1;_ylt =Auvf3s6LQK_pOaJlb954T_DQn6gB; 1 page.

Feddema et al., "Cooperative Sentry Vehicles and Differential GPS Leapfrog," 2000, *United States Department of Energy*, pp. 1-12.

Maxwell et al., "Alfred: The Robot Waiter Who Remembers You," *AAAI Technical Report WS-99-15*, 1999, 12 pages.

Shibata et al., "Development and Integration of Generic Components for a Teachable Vision-Based Mobile Robot," *IEEE/ASME Transactions on Mechatronics*, 1996, 1(3):230-236.

U.S. Appl. No. 11/827,065, filed Jul. 10, 2007 to Johnson.

Yogesh C. Rathod, Third Party Submission in U.S. Appl. No. 12/233,358 mailed Mar. 30, 2010, 12 pages.

* cited by examiner

VARYING USER INTERFACE ELEMENT BASED ON MOVEMENT

BACKGROUND

The subject matter of this specification relates generally to graphical user interfaces.

Many of today's computers and devices include a graphical user interface ("GUI"), through which a user can interact with the computer or device. A GUI can include various user interface elements, such as windows, scroll bars, and so on. Some of these elements can be manipulated by users to perform actions. For example, the user can click on a window or a scroll bar and move it within the GUI. Conventional user interface elements are often static in their appearance, which can detract from the overall look and feel of the GUI.

SUMMARY

In general, one aspect of the subject matter described in this specification can be embodied in methods that include the actions of detecting movement of a user interface element including first and second pattern layers, and while the user interface element is moving, translating a first pattern layer relative to a second pattern layer. Other embodiments of this aspect include corresponding systems, apparatus, computer program products, and computer readable media.

In general, one aspect of the subject matter described in this specification can be embodied in methods that include the actions of detecting movement of a user interface element, and while the user interface element is moving, modifying a graphical characteristic of the user interface element. Other embodiments of this aspect include corresponding systems, apparatus, computer program products, and computer readable media.

Particular embodiments of the subject matter described in this specification can be implemented to realize one or more of the following advantages. Movable user interface elements can be made more aesthetically pleasing during movement of the elements.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
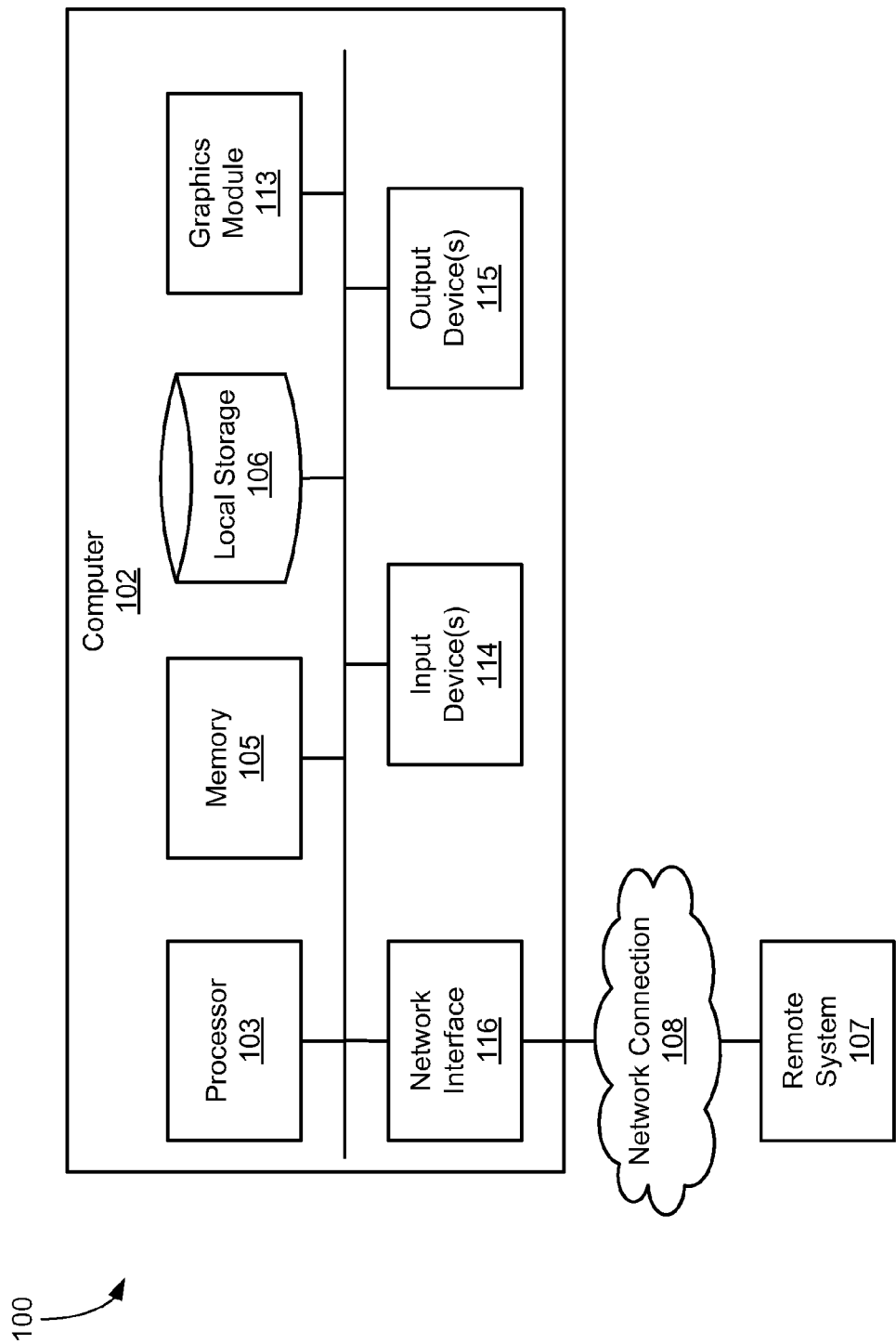
FIG. 1 is a block diagram of an example of a system architecture for generating and presenting user interface elements.

FIG. 1 is a block diagram of an architecture 100 for generating and presenting user interface elements that can be manipulated within a user interface by a user. The architecture 100 includes a personal computer 102. The computer 102 is optionally communicatively coupled to a remote server 107 or other computer system using a network interface 116 and a network 108 (e.g., local area network, wireless network, Internet, intranet, etc.). The computer 102 generally includes a processor 103, memory 105, one or more input devices 114 (e.g., keyboard, mouse, etc.) and one or more output devices 115 (e.g., a display device). A user interacts with the architecture 100 using the input and output devices 114 and 115, respectively. Architecture 100 can include hardware, software, and combinations of the two.

The computer 102 also includes a local storage device 106 and a graphics module 113 (e.g., graphics card) for storing information and generating user interface elements, respectively. The local storage device 106 can be a computer-readable medium. The term "computer-readable medium" refers to any medium that includes data and/or participates in providing instructions to a processor for execution, including without limitation, non-volatile media (e.g., optical or magnetic disks), volatile media (e.g., memory) and transmission media. Transmission media includes, without limitation, coaxial cables, copper wire, fiber optics, and computer buses. Transmission media can also take the form of acoustic, light or radio frequency waves.

While generating and presenting user interface elements are described with respect to a personal computer 102, it should be apparent that the disclosed implementations can be incorporated in, or integrated with, any electronic device that has a user interface, including without limitation, portable and desktop computers, servers, electronics, media players, game devices, mobile phones, smart phones, email devices, personal digital assistants (PDAs), embedded devices, televisions, other consumer electronic devices, set top boxes, etc.

One of ordinary skill in the art will recognize that the engines, methods, processes and the like that are described can themselves be an individual process or application, part of an operating system, a plug-in, an application, or the like. In one implementation, the system and methods can be implemented as one or more plug-ins that are installed and run on the personal computer 102. The plug-ins are configured to interact with an operating system (e.g., MAC OS X, WINDOWS XP, WINDOWS VISTA, LINUX, etc.) and to perform the various functions, as described with respect to FIGS. 2A-6. A system and method for generating user interface elements can also be implemented as one or more software applications running on the computer 102. Such a system and method can be characterized as a framework or model that can be implemented on various platforms and/or networks (e.g., client/server networks, wireless networks, stand-alone computers, portable electronic devices, mobile phones, etc.), and/or embedded or bundled with one or more software applications (e.g., email, media player, browser, etc.).

The computer 102 can store data items, such as files and other data objects, in the local storage device 106, for example. Examples of data items include documents, images or graphics, video clips, audio clips, and so forth.

In some implementations, the computer 102 can generate and present user interfaces that include one or more user interface elements. Examples of user interface elements include, without limitation, windows, buttons, scroll bars, icons, sliders, tabs, toolbars, and so on.

In some implementations, a user interface includes one or more user interface elements that can be manipulated by a user. The user interface elements can serve as control points through which the user can manipulate the user interface and communicate with the computer 102. Examples of user interface elements that can be manipulated by a user include scroll bars, sliders, buttons, and so on. For example, a window can include one or more scroll bars, which the user can use to scroll through content presented in the window.

In some implementations, a user interface element in the user interface can be moved by the user. The user, for example, can click on a user interface element (e.g., a scroll bar, a slider) and drag it to move it. Depending on the particular element, a user interface element can be moved freely within the bounds of the display screen or be constrained to move along a predefined path.

Figure 2A:
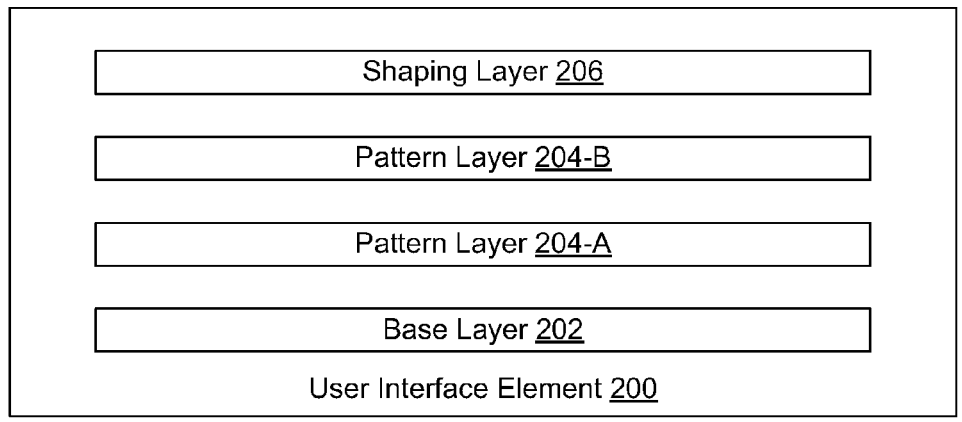
FIGS. 2A-2B are diagrams illustrating an example structure of a user interface element and components of the user interface element.
Figure 2B:
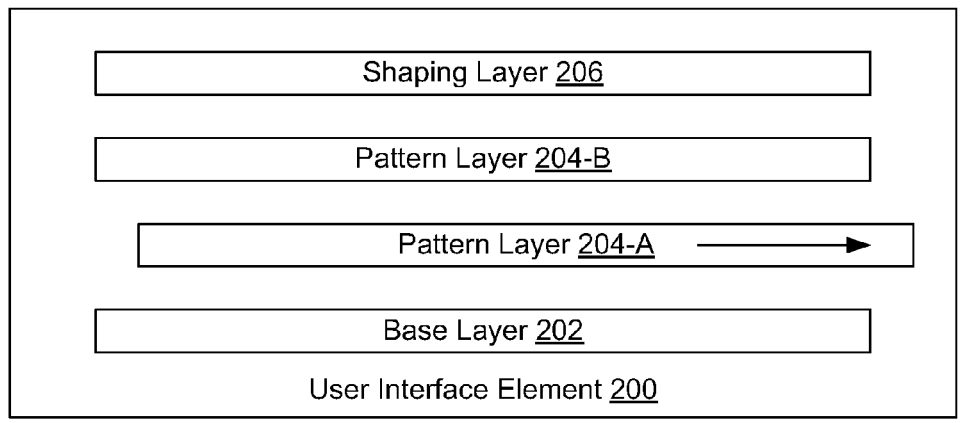
Figure 2B:
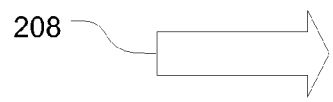

FIGS. 2A-2B illustrate an example user interface element 200. In some implementations, a user interface element is generated from multiple graphical layers. In some implementations, the user interface element is a composite of a base layer 202, one or more pattern layers 204, and a shaping layer 206.

The base layer 202 defines one or more basic characteristics of the user interface element 200. In some implementations, the base layer 202 is a graphic that includes the color of the user interface element 200. For example, the base layer 202 can be a shape that is filled with the desired color for the user interface element 200.

One or more pattern layers 204 (shown as pattern layers 204-A and 204-B) define one or more graphical patterns on the user interface element 200. In some implementations, a pattern layer is a graphic that includes a graphical pattern. An example of a graphical pattern is a series of spaced-apart wave shapes. In some implementations, each of the pattern layers 204 has respective patterns, and visual effects on the user interface element 200 can be generated by translating the pattern layers relative to each other. In some implementations, patterns overlaid on the base layer 202 take on the color of the base layer 202 or some shade thereof.

A shaping layer 206 defines a shape of the user interface element 200. In some implementations, the shaping layer 206 includes an area that is in the desired shape for the user interface element. For example, if the user interface element 200 is a scroll bar, the shaping layer 206 can include an area that is generally rectangular with square or rounded ends. When the shaping layer 206 is overlaid over the other layers, such as the base layer 202 and the pattern layers 204, the rectangular area encloses portions of the layers 202, 204, including the colors and patterns from layers 202, 204. The enclosed area, including the color and patterns, is combined and rendered as the user interface element.

In some implementations, the user interface element can further include a control details layer. The control details layer defines what actions can be performed on the user interface element or how the user interface element can be manipulated by a user. In some other implementations, control details can be included in the base layer 202.

Some user interface elements can be manipulated by a user. For example, a user can click-and-drag a scroll bar or a slider to move it along a predefined path. In some implementations, while a user interface element is moving (e.g., dragged by a user), one or more pattern layers 204 can be translated or shifted relative to other pattern layers within the user interface element. As shown in FIG. 2B, when the user interface element 200 is moved in the direction of movement 208, pattern 204-A can be shifted relative to pattern 204-B in the direction of movement 208. The shifting or translation can be used to simulate animation or some other visual effect in the user interface element while the user interface element is being moved. Further details of the translation of patterns relative to each other are described below.

Figure 3:
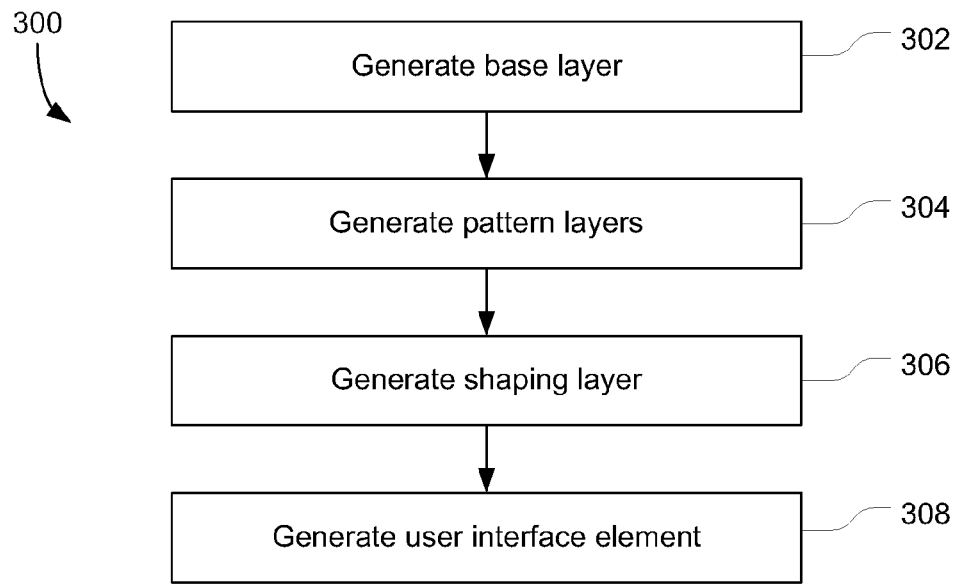
FIG. 3 is a flow diagram illustrating an example process for generating a user interface element.

FIG. 3 illustrates an example process 300 for generating a user interface element. For convenience, the process 300 will be described in reference to a system (e.g., system 100) that performs the process.

A base layer is generated (302). In some implementations, the graphics module 113 can generate the base layer based on predefined specifications. For example, the graphics module 113 generates a base layer that is filled with a particular color. In some implementations, a generated base layer includes alpha channel values. In some other implementations, the base layer can further include control details based on the user interface element to be generated.

One or more pattern layers are generated (304). The graphics module 113 can generate a pattern layer based on predefined pattern specifications. In some implementations, a generated pattern layer includes alpha channel values. In some implementations, the graphics module 113 can generate multiple graphical layers, each with its own pattern. In an example implementation, a pattern is alpha masked into a layer by the graphics module 113.

A shaping layer is generated (306). In some implementations, the graphics module 113 can generate a shaping layer for a desired user interface element based on predefined specifications. For example, if the desired user interface element is a scroll bar, a scroll bar shaping layer is generated. On the other hand, if the desired user interface element is a slider control, a slider shaping layer is generated. In some other implementations, there are stored in the computer 102 predefined shaping layers for various user interface elements. The graphics module 113 identifies and retrieves the appropriate shaping layer based on the desired user interface element.

In some implementations, additional layers can be generated. For example, a control details layer can be generated by the graphics module 113. The control details layer defines limitations on how users can manipulate the user interface element.

A user interface element is generated (308). In some implementations, the user interface element is generated by compositing the generated layers. For example, the graphics module 113 can composite the base layer, the one or more pattern layers, and the shaping layer to form a user interface element. In some implementation, the compositing is performed using alpha masking techniques, which are well-known in the art.

Figure 4:
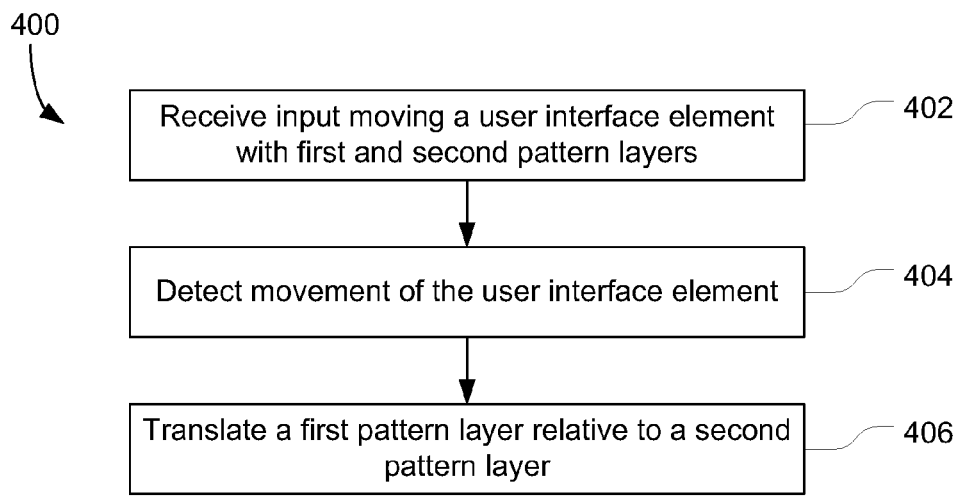
FIG. 4 is a flow diagram illustrating an example process for changing the appearance of a user interface element based on movement of the user interface element.

FIG. 4 illustrates an example process 400 for changing the appearance of a user interface element based on movement of the user interface element. For convenience, the process 400 will be described in reference to a system (e.g., system 100) that performs the process.

An input moving the user interface element is received (402). In some implementations, a user can direct the system 100 to move a displayed user interface element. For example, a user can, using an input device (e.g., a mouse), select (e.g., by clicking) the user interface element and drag the user interface element to move it.

Movement of the user interface element is detected (404). The system 100 detects, based on the received input, movement of the user interface element by the user. In some implementations, system 100 also detects the direction of the movement.

While the user interface element is moving, one or more pattern layers in the user interface element is/are translated relative to one or more other patterns layers in the user interface element (406). As the user interface element moves in response to user input, the system 100 shifts one or more pattern layers within the user interface element relative to other pattern layers in the user interface element, while all of the pattern layers in the user interface element are moving together as part of the user interface element. The shift of a pattern layer relative to the other pattern layers can be in the direction of the movement of the user interface element. Thus, for example, if the user interface element is moving horizontally rightward, the pattern is translated rightward relative to the other patterns.

In some implementations, the rate at which a pattern layer is translated is a function of the speed at which the user interface element moves. In one implementation, the translation is pixel-for-pixel with respect to the user interface element. That is, the pattern on the pattern layer is translated one pixel relative to the patterns on the other pattern layers for each pixel of movement of the user interface element. In another implementation, the translation rate is linearly proportional to the speed at which the user interface element is moving. In a further implementation, the translation rate is non-linearly proportional to the speed at which the user interface element is moving. In yet another implementation, the translation rate is a constant, regardless of how fast the user interface element is moving.

The translation (e.g., of a pattern layer relative to other pattern layers) stops when the user interface element stops moving. If the user interface element moves again in the same direction as before, the translation resumes.

In some implementations, one or more of the pattern layers in the user interface element can be translated relative to the other pattern layers in the user interface element. The pattern layers that are translated can all have the same translation rate, or each of these pattern layers can have its own translation rate.

The direction of movement of the user interface element can be changed by the user through an input device 114. The system 100 can detect the change in direction based on the received user input. In some implementations, the pattern layers on the user interface element can be changed (e.g., reversed) in response to the change in direction, reversing the patterns on the reversed layers. In this example, one or more of the reversed patterns are translated in the new direction of movement relative to the other patterns.

The translation of the patterns in the user interface element is displayed on-screen. The user perceives the translation as a visual effect on the user interface element that occurs when the user interface element is moved.

Figure 5:
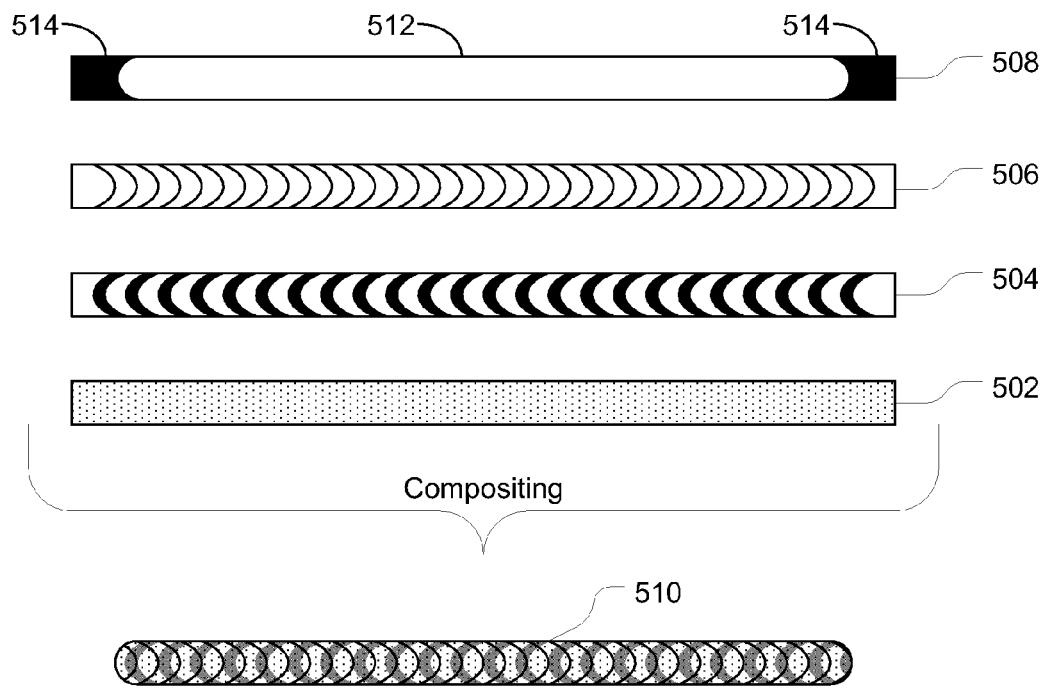
FIG. 5 illustrates example graphical layers and a user interface element formed from the layers.

FIG. 5 illustrates a conceptual example of graphical layers and a scroll bar user interface element formed from the layers. A base layer 502 includes a color (represented by the dots). One or more pattern layers 504 and 506 each have a pattern on it. For example, pattern layer 504 includes a pattern of repeating thick waves and pattern layer 506 includes a pattern of repeating thin waves. In some implementations, the patterns on the pattern layers are continuous; the patterns are not depleted by the translation. Thus, for example, when a pattern is translated out of view at one end of the user interface element, the pattern is translated into view at the opposite end.

Shaping layer 508 includes an area 512 that defines the shape of the user interface element to be generated and an opaque area 514 that masks out the portions of the layers that are outside of the area 512.

The layers 502, 504, 506, and 508 can be composited using alpha masking techniques, for example. The result of the compositing is a scroll bar 510. The scroll bar 510 has the shape defined by area 512. The patterns in layers 504 and 506 are combined. Parts of the scroll bar 510 adopts the color of the base layer 502 and other parts of the scroll bar 502 adopt a shade of the base layer color, depending on the alpha channel values in the layers.

Figure 6:
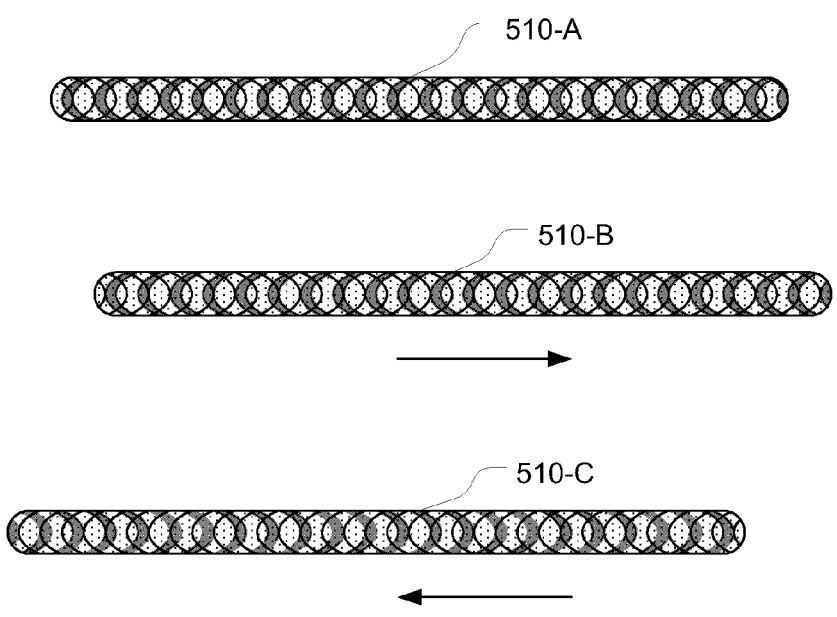
FIG. 6 illustrates example translations of a pattern layer relative to another pattern layer within a user interface element.

FIG. 6 illustrates example translations of a pattern layer relative to another pattern within the scroll bar 510. Scroll bar 510-A shows the scroll bar at rest. When the scroll bar is moved rightward, the thin waves pattern (i.e., pattern layer 506) is translated rightward relative to the thick waves pattern (i.e., pattern layer 504), as shown in scroll bar 510-B. If the scroll bar moves leftward, the patterns are reversed and the thin waves pattern (i.e., pattern layer 506) is translated leftward relative to the thick waves pattern (i.e., pattern layer 504), as shown in scroll bar 510-C.

While the implementations described above describe translating pattern layers in response to movement of the user interface element, other graphical changes to the user interface element can be performed in response to movement of the user interface element. For example, a user interface element can include one or more layers that define lighting, shading, or color characteristics for the user interface element. When the user moves the user interface element, the layer or layers change to change the lighting, shading, or color characteristics of the user interface element. For example, a vertical scrollbar can have a brighter shading as it is moved closer to the top, and a darker shading as it is moved closer to the bottom.

More generally, various graphical characteristics of one or more elements in a graphical user interface can be changed in response to various conditions or inputs at the computer 102, or in response to satisfaction of particular conditions or criteria, not just user input from a user input device. For example, the color or brightness of a menu bar can be changed based on the time of day, amount of computer use, activity or idleness of the computer, and so on. Further, in some implementations, the entire graphical user interface, not just particular user interface elements, can be changed in response to satisfaction of some condition or criterion.

The disclosed and other embodiments and the functional operations described in this specification can be implemented in digital electronic circuitry, or in computer software, firmware, or hardware, including the structures disclosed in this specification and their structural equivalents, or in combinations of one or more of them. The disclosed and other embodiments can be implemented as one or more computer program products, i.e., one or more modules of computer program instructions encoded on a computer-readable medium for execution by, or to control the operation of, data processing apparatus. The computer-readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machinegenerated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, the disclosed embodiments can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The disclosed embodiments can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of what is disclosed here, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of what being claims or of what may be claimed, but rather as descriptions of features specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understand as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments have been described. Other embodiments are within the scope of the following claims.

What is claimed is:

1. A method comprising:
 detecting a direction of movement of a user interface element, the user interface element including a first pattern layer and a second pattern layer;
 while the user interface element is moving, creating a graphical pattern using the first pattern layer and the second pattern layer, wherein creating the graphical pattern comprises:
  overlaying the first pattern layer on the second pattern layer;
  translating the first pattern layer relative to the second pattern layer;
  detecting a change in the direction of the movement;
  inverting the first pattern layer and the second pattern layer in response to the detected change; and
  translating, in the detected changed direction of the movement, the first pattern layer relative to the second pattern layer; and
 providing the graphical pattern for display on the moving user interface element.

2. The method of claim 1, wherein translating the first pattern layer relative to the second pattern layer comprises translating the first pattern layer, in the detected direction of movement, relative to the second pattern layer.

3. The method of claim 1, wherein the user interface element is a slider.

4. The method of claim 1, wherein translating the first pattern layer relative to the second pattern layer comprises translating the first pattern layer at a rate that is a function of a rate of the movement of the user interface element.

5. The method of claim 1, wherein translating the first pattern layer relative to the second pattern layer comprises translating the first pattern layer at a rate linearly proportional to a rate of the movement of the user interface element.

6. The method of claim 1, wherein the user interface element comprises:
 a base layer;
 a plurality of pattern layers, including the first and second pattern layers; and
 a shaping layer.

7. The method of claim 6, wherein the user interface element is an alpha composite of the base later, the pattern layers, and the shaping layer.

8. A computer program product, encoded on a computer-readable storage device, operable to cause a data processing apparatus to perform operations comprising:
 detecting a direction of movement of a user interface element, the user interface element including a first pattern layer and second pattern layer;
 while the user interface element is moving, creating a graphical pattern using the first pattern layer and the second pattern layer, wherein creating the graphical pattern comprises:
  overlaying the first pattern layer on the second pattern layer;
  translating the first pattern layer relative to the second pattern layer;
  detecting a change in the direction of the movement
  inverting the first pattern layer and the second pattern layer in response to the detected change; and
  translating, in the detected changed direction of the movement, the first pattern layer relative to the second pattern layer; and
 providing the graphical pattern for display on the moving user interface element.

9. The computer program product of claim 8, wherein the user interface element is a slider.

10. The computer program product of claim 8, further operable to cause the data processing apparatus to perform operations comprising translating the first pattern layer at a rate that is a function of a rate of the movement of the user interface element.

11. The computer program product of claim 8, further operable to cause the data processing apparatus to perform operations comprising translating the first pattern layer at a rate linearly proportional to a rate of the movement of the user interface element.

12. The computer program product of claim 8, wherein the user interface element comprises:
 a base layer;
 a plurality of pattern layers, including the first and second pattern layers; and
 a shaping layer.

13. The computer program product of claim 12, wherein the user interface element is an alpha composite of the base layer, the pattern layers, and the shaping layer.

14. A system, comprising:
 one or more processors configured to perform operations comprising:
  detecting a direction movement of a user interface element, the user interface element including a first pattern layer and a second pattern layer;
  while the user interface element is moving, creating a graphical pattern using the first pattern layer and the second pattern layer, wherein creating the graphical pattern comprises:
   overlaying the first pattern layer on the second pattern layer; and
   translating the first pattern layer relative to the second pattern layer;
   detecting a change in the direction of the movement
   inverting the first pattern layer and the second pattern layer in response to the detected change; and
   translating, in the detected changed direction of the movement, the first pattern layer relative to the second pattern layer; and
  providing the graphical pattern for display on the moving user interface element.

15. The system of claim 14, wherein the user interface element comprises:
 a base layer defining a color of the user interface element;
 the first pattern layer defining a first graphical pattern;
 the second pattern layer defining a second graphical pattern; and
 a shaping layer defining a shape of the user interface element.

16. The system of claim 15, wherein the first graphic pattern and the second graphic pattern each comprises a series of spaced-apart wave shapes.

17. The system of claim 16, wherein the first graphic pattern includes a series of thick waves, and the second graphic pattern includes a series of thin waves.

18. A method, comprising:
 detecting a direction of movement of a user interface element, the user interface element including a first pattern layer and a second pattern layer;
 while the user interface element is moving, creating an animated effect, wherein creating the animated effect comprises:
  overlaying the first pattern layer on the second pattern layer; and
  translating the first pattern layer relative to the second pattern layer
 detecting a change in direction of the movement;
 inverting the first pattern layer and the second pattern layer in response to the detected change; and
 while the user interface element is moving, translating, in the detected changed direction of the movement, the first pattern layer relative to the second pattern layer.

19. The method of claim 1, wherein the first pattern layer comprises a repeating pattern of transparent portions and opaque portions.

20. The method of claim 19, wherein the repeating pattern is a wave pattern.

* * * * *